Figure 1:
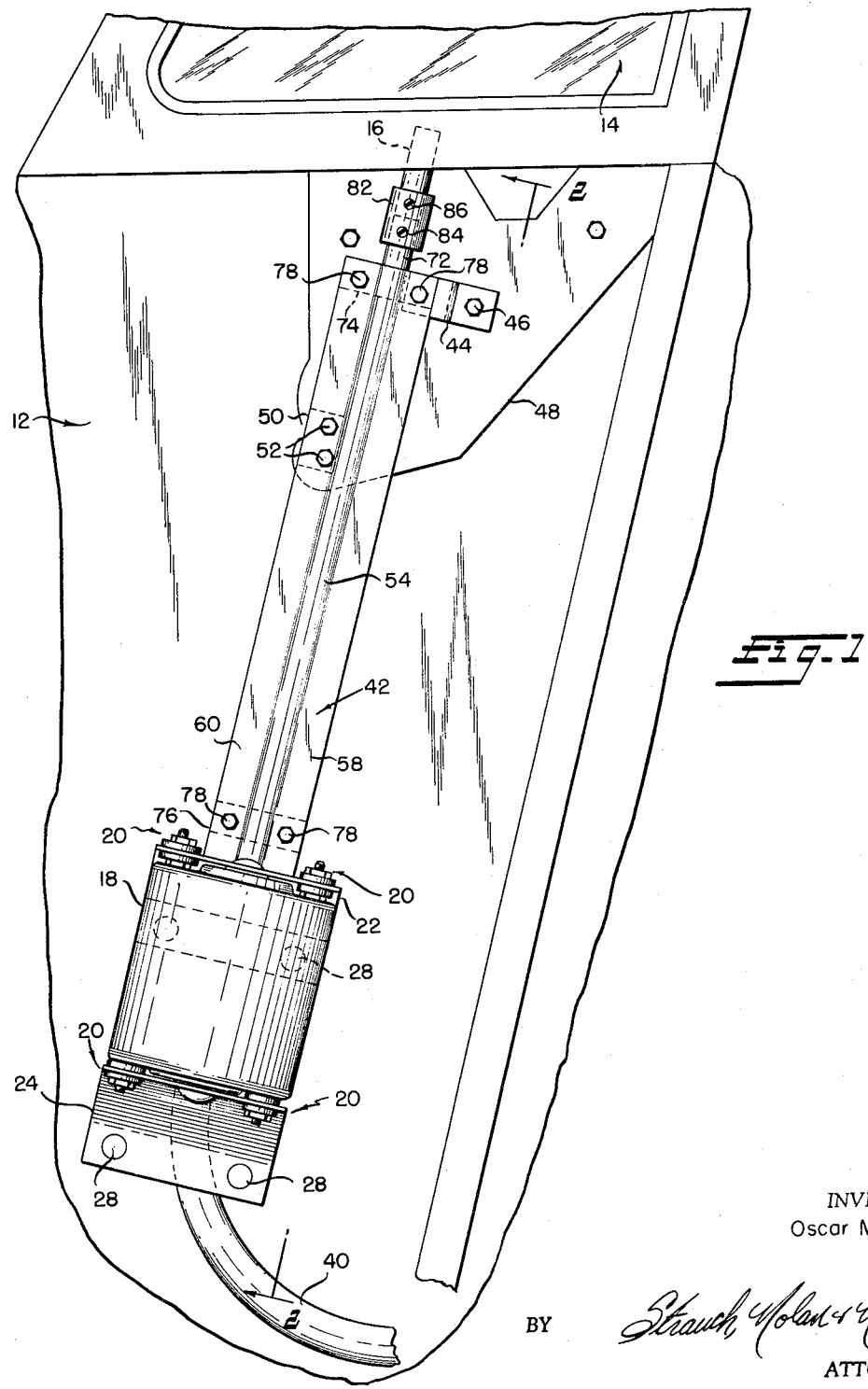

July 21, 1964  O. M. VOILES  3,141,663
POWER OPERATED VENT WINDOW REGULATOR
Filed Oct. 12, 1961  2 Sheets-Sheet 1

INVENTOR
Oscar M. Voiles

BY *Strauch, Nolan & Neale*
ATTORNEYS

July 21, 1964   O. M. VOILES   3,141,663
POWER OPERATED VENT WINDOW REGULATOR
Filed Oct. 12, 1961   2 Sheets-Sheet 2
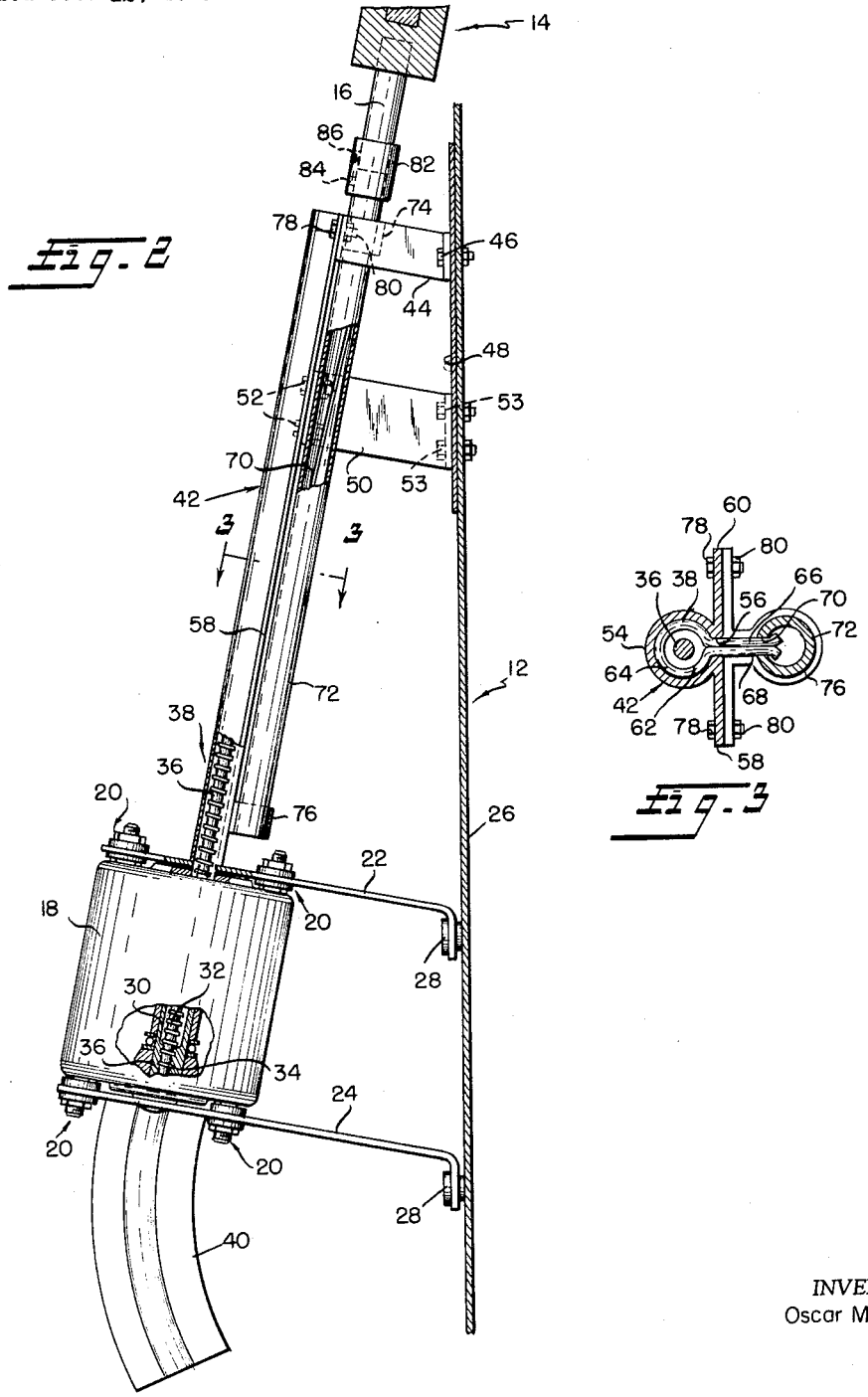
INVENTOR
Oscar M. Voiles
BY
ATTORNEYS United States Patent Office 3,141,663
Patented July 21, 1964

3,141,663
POWER OPERATED VENT WINDOW
REGULATOR
Oscar M. Voiles, Birmingham, Mich., assignor to Hupp Corporation, Cleveland, Ohio, a corporation of Virginia
Filed Oct. 12, 1961, Ser. No. 144,785
7 Claims. (Cl. 268—121)

This invention relates to electrically operated regulators for rotating pivotally mounted automotive vent windows between open and closed positions.

Power operated vent window regulators heretofore employed utilized vacuum or hydraulic motors or, later, electric motors. Typical prior art fluid motor operated regulators are shown in United States Patents 2,308,057 and 2,338,965.

The most serious objections to vacuum and fluid motor operated regulators are their bulkiness and the necessity of leading vacuum or hydraulic lines into the vent window mounting door or vehicle body structure to operate the regulator. To overcome these difficulties, it was proposed to substitute an electric drive motor for the vacuum or hydraulic motor of the earlier designs. United States Patent 2,883,183 is exemplary of currently available electric motor operated vent window regulators.

Electric motor operated regulators obviated certain of the difficulties appurtenant to the vacuum and hydraulic motor powered regulators but had several new and undesirable characteristics. The electric motors employed operated at speeds ranging up to 3600 r.p.m., yet it was desired to rotate the window at a speed of about one revolution per minute so the operator could stop the window in the position he wished. Accordingly a complicated cam and gear triple reduction train was interposed between the motor and the vent window. Not only was this mechanism complicated, bulky, and expensive, but it was apt to damage the vent window and the electric motor. That is, the great speed reduction between the electric motor and the final member of the gear train connected to the vent window resulted in an equally great multiplication of the mechanical advantage between the motor and the drive member. Moreover, the type of reduction drive employed provided positive motion transmission between the motor and drive member. Consequently, should the operator fail to release the window operating button to deactivate the electric drive motor concurrently with its arrival at the fully opened or closed positions or upon its encountering an obstacle, undue stress would be placed on the vent window or the motor would be mechanically stalled, causing it to overheat with resultant damage to the armature and field windings.

To overcome this problem, limit switches were provided to interrupt the motor circuit when the fully opened and closed positions were reached. This was not a satisfactory solution since the limit switch arrangement added to the complexity and expense of the regulator and did nothing to overcome the problem arising from the vent window encountering an obstruction in moving from one position to another.

Accordingly, it is a primary object of this invention to provide improved, simplified, compact, and less expensive electrically operated automotive vent window regulators.

It is a further primary object of this invention to provide an automotive vent window regulator operated by an electric motor and having a highly simplified double reduction drive interposed between the motor and the vent window to rotate the window at a slow uniform speed and constructed to provide a yielding connection between the motor and the window to eliminate the need for limit switches and similar protective devices.

It is a further object of this invention to provide an electrically operated automotive vent window regulator which may be employed, with only minor structural modifications in any of the wide variety of automotive vehicles built or contemplated by the different manufacturers.

These objects are attained, in the present invention, by employing an electric drive motor having a hollow drive shaft through which a flexible drive cable extends. Driving engagement is established between the drive shaft and the drive cable by internal threads on the hollow drive shaft and a strand helically wound onto and rigid with the drive cable. The drive cable carries a follower at one end and is surrounded by a guide member arranged to maintain it and the follower non-rotatable. Thus, as the electric motor drive shaft rotates, rectilinear motion is imparted to the cable and, therefore, to the follower.

An axially fixed tubular member is journalled for rotational movement in parallel spaced relationship to the guide member and is provided with a helical or spiral slot through its wall which receives the end of the follower. This arrangement translates the rectilinear motion of the follower to rotational motion of the tubular member. The vent window is mounted between a pair of axially aligned, spaced apart pivot pins, one of which is fixed to the tubular member and is rotated by it. When the electric drive motor is activated then, rotary motion of the motor drive shaft is translated to rectilinear motion of the follower and the rectilinear follower motion is translated to rotary motion of the tubular member. The pivot pin is rotated by the tubular member and moves the vent window between the open and closed positions.

The regulator provided by this invention is more compact, less complicated, and less costly to manufacture than the power operated vent window regulators of the prior art since the complicated gear reduction drives and limit switch arrangements required by those regulators is eliminated. In addition, the simplified reduction drive of the present invention provides a yielding connection between the motor and the vent window. This is a distinct advantage since, when the vent window reaches the fully opened or fully closed positions or strikes an obstruction in traveling between these positions, the motor drive shaft may continue to rotate even though the final drive member connected to the vent window is immobilized. As a result, ample time is afforded for the operator to release the window button to deactivate the drive motor before the vent window is damaged by undue torsional stresses being imparted to it or the motor is caused to overheat by mechanical stalling.

Also, because of the high mechanical advantage and the yielding connection between the drive motor and the vent window, the window will remain in the position to which it is rotated by the operator.

Further novel features and objects of this invention will become apparent from the following detailed description, discussion and the appended claims taken in conjunction with the accompanying drawings showing a preferred structure and embodiment, in which:

FIGURE 1 is an elevational view of a typical automotive vehicle door incorporating a vent window and an electrically operated vent window regulator constructed in accordance with the principles of the present invention;

FIGURE 2 is a view taken substantially along line 2—2 of FIGURE 1 with parts of the drive cable guide and the electric drive motor broken away to show the nature of the connection between the motor drive shaft and the drive cable; and, FIGURE 3 is a view taken substantially along line 3—3 of FIGURE 2 showing the motion translating coupling between the drive cable and the tubular window rotating member.

Referring now to the drawings, FIGURE 1 illustrates, generally, an automobile door 12 provided with the typical vent window 14 and an electrically operated vent window regulator constructed in accordance with the principles of the present invention. Vent window 14 is, as is conventional, mounted for pivotal movement between closed and open positions by a pair of axially aligned, spaced apart pivot pins attached, respectively, to the top and bottom of the window. Only the lower pivot pin 16 is shown but it is to be understood that it and the upper pivot pin are attached to the interior of door 12 in the conventional manner. Pivot pin 16, which is fixed to window 14, is also fixed to, and rotatable by, the vent window regulator to pivot vent window 14 between open and closed positions.

The power source for the vent window regulator is a fractional horsepower, reversible, motor 18 mounted by conventional resilient shock mount assemblies 20 on upper and lower motor support brackets 22 and 24. These brackets are attached to the inner panel 26 of door 12 by a suitable fastening means such as clinch nuts 28. Motor 18 has a hollow drive shaft 30 provided, at least at its lower end, with threads 32 which engage a strand 34 helically wound on the flexible drive cable 36 of a drive cable assembly 38. This motor and drive cable arrangement is disclosed in United States Patent 2,919,911 to which reference may be had for further detail.

Drive cable assembly 38 extends downwardly into a hollow lower guide 40 which may be attached, at its upper end, to the bottom of lower motor support bracket 24. It is the function of lower guide 40 to keep cable assembly 38 free of door latch mechanism and similar obstructions as the assembly moves downwardly through hollow drive shaft 30. By providing lower guide 40 with an appropriate configuration, the vent regulator may be employed in any of the wide variety of door or body structures employed in automotive vehicles.

The opposite end of cable assembly 38 extends upwardly from drive motor 18 through an upper guide 42 attached, at its lower end, to the top of the upper motor support bracket 22. The upper end of upper guide 42 may be fastened to a bracket 44 which may, in turn, be secured by screw 46 to any convenient door structure such as the depending structural member 48 (see FIGURE 1). If desired, a spacer 50 may also be mounted between any convenient door structure such as the depending member 48 and upper guide 42 by screws 52 and 53 to maintain the proper axial alignment between the motion transmitting members of the regulator and pivot pin 16. The details of these brackets and spacers will vary depending upon the particular door with which the regulator is employed and the details of their construction, therefore, is not essential to the practice of this invention. Upper guide 42 may be bent from a piece of sheet metal to provide an enlarged cable assembly receiving portion 54, a narrow elongated slot 56, and oppositely disposed mounting flanges 58 and 60 (see FIGURE 3).

A follower member 62 is fixed to the upper end of cable assembly 38 by brazing or other appropriate method. As is shown in FIGURE 3, follower 62, which may be bent from a piece of sheet metal, has a main body portion 64 disposed in surrounding and engaging relationship to the helical strand 36 of cable assembly 38, and a pair of arm portions 66 and 68 which may be secured together by brazing or spot welding. Arm portions 66 and 68 extend through and are free to slide up and down in slot 56 in upper guide 42. The side walls of slot 56, however, prevent follower 62 (and, therefore, drive cable assembly 38) from rotating. Thus, when motor 18 is activated to rotate hollow drive shaft 30, the interengagement of threads 32 on the drive shaft and the strand 34 of cable assembly 38 causes cable assembly 38 and follower 62 to move axially in upper guide 42.

Arms 66 and 68 of follower 62 also extend through a helical slot 70 cut through the wall of an elongated tubular member 72. The ends of the follower arm portions 66 and 68 may be flared outwardly (as shown in FIGURE 3) to maintain them within tubular member 72. Tubular member 72 is rotatably journalled in upper and lower support brackets 74 and 76 which are attached to the opposite ends of upper guide 42 by bolts 78 and nuts 80.

Tubular member 72 is rotatively fixed, at its upper end, to the pivot pin 16 mounting vent window 14 by a coupling 82 and set screws 84 and 86. This arrangement, as is apparent from FIGURE 1, axially fixes tubular member 72 with respect to upper guide 42. As follower 62 moves upwardly and downwardly in upper guide 42, it causes tube 72 to rotate about its longitudinal axis in brackets 74 and 76, thus rotating pivot pin 16 which, in turn, rotates the vent window 14 to the desired open or closed position.

As was pointed out above, drive cable assembly 38 yields when the vent window 14 reaches its extreme open or closed positions or strikes an obstruction, affording the operator ample time to release the motor activating window button before the motor or the vent window are damaged.

The arc through which a vent window is rotated between the open and closed positions ordinarily ranges from 90° to 120°. The helical slot 70 is arranged to extend around member 72 the same number of degrees. Since the length of tubular member 72 is many times its diameter, and since slot 70 may extend substantially the entire length of the tube, the pitch of the slot is very high and the mechanical advantage attained by the member is relatively great. As a result, only a very small and low-powered electric motor is required to open and close the ordinary vent window and to hold it in the desired position to which it is adjusted by the operator. Conventional push button window controls may be provided for activating drive motor 18.

The invention may be embodied in other specific forms without departing from the spirit or essential characteristics thereof. For example, the electrically operated regulator may be employed to operate any pivoted window; for example, the rear quarter panel windows provided in certain types of automobiles. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power driven window operator for rotating between open and closed positions a vehicle vent window mounted between a pair of axially aligned, spaced apart pivot members and rotatable by one of said members comprising: a reversible electric drive motor rigid with the vehicle structure and having a hollow drive shaft; a flexible cable extending through said drive shaft; means providing a threaded connection between said cable and said drive shaft; a follower member rigidly mounted on said cable; guide means extending from said motor toward said vent window for guiding said cable and preventing rotation of said cable and said follower whereby said cable and said follower will be moved axially when said drive shaft is rotated; a tubular member having a spiral slot receiving said follower, means mounting said tubular member for rotation about an axis parallel to said cable while preventing axial movement of said member whereby axial movement of said follower will cause rotation of said tubular member; and means for connecting said tubular member to said vent window rotating pivot member.

2. A power driven window operator for rotating between open and closed positions a vehicle vent window mounted between a pair of axially aligned, spaced apart pivot members and rotatable by one of said members comprising: a reversible electric drive motor rigid with said vehicle and having a hollow drive shaft; a flexible cable extending through said drive shaft; means providing a threaded connection between said cable and said drive shaft; a follower member rigid with said cable; guide means for maintaining said cable and said follower non-rotatable whereby said cable and said follower will be moved axially through said drive shaft when said drive shaft is rotated; a hollow rotatable member supported adjacent said guide means; means operatively associated with said follower and said member for converting axial movement of said follower to rotational movement of said member; and means connecting said member to said vent window rotating pivot member.

3. A power driven window operator for rotating between open and closed positions a vehicle vent window mounted between a pair of axially aligned, spaced apart pivot members and rotatable by one of said members comprising: a reversible electric drive motor rigid with the vehicle structure and having a rotatable drive shaft; flexible motion transmitting means; means including means operatively connected between said drive shaft and said motion transmitting means for converting the rotational movement of said drive shaft means into axial movement of said flexible motion transmitting means; a hollow rotatably mounted motion transmitting member supported adjacent said motion transmitting means; means connected between said flexible motion transmitting means and said rotatable motion transmitting member for converting axial movement of said flexible member into rotational movement of said rotatable member; and means connecting said rotatable member to said vent window rotating pivot member.

4. In combination, a vehicle vent window pivotally mounted for rotational movement between open and closed positions by a pair of axially aligned, spaced apart pivot members and a power driven window regulator for rotating said window between said open and closed positions comprising a reversible electric drive motor rigid with the vehicle structure and having a hollow drive shaft; a flexible cable extending through said drive shaft; means providing a threaded connection between said cable and said drive shaft; a follower member mounted on said cable; guide means extending from said motor toward said vent window for guiding said cable and preventing rotation of said cable and said follower whereby said cable and said follower will be moved axially through said drive shaft when said drive shaft is rotated by said motor; a tubular member having a spiral slot receiving said follower; means mounting said tubular member for rotation about an axis parallel to said cable while preventing axial movement of said member whereby axial movement of said follower will cause rotation of said tubular member; and means for connecting said tubular member to one of said vent window pivot members.

5. In combination, a vehicle vent window pivotally mounted for rotational movement between open and closed positions by a pair of axially aligned, spaced apart pivot members and a power driven window regulator for rotating said window between said open and closed positions comprising a reversible electric drive motor rigid with said vehicle and having a hollow drive shaft; a flexible cable extending through said drive shaft; means providing a threaded connection between said cable and said drive shaft; a follower member rigid with said cable; means extending from said motor toward said vent window for guiding said cable through said hollow drive shaft and preventing rotation of said cable and said follower whereby rotational movement of said drive shaft will be translated into axial movement of said cable and said follower; a hollow rotatably mounted motion transmitting member supported adjacent said cable guiding means; means operatively connected between said follower and said motion transmitting member for translating axial movement of said follower into rotational movement of said motion transmitting member; and means for connecting said motion transmitting member to one of said vent window pivot members.

6. In combination, a vehicle vent window pivotally mounted for rotational movement between open and closed positions by a pair of axially aligned, spaced apart pivot members and a power driven window regulator for rotating said window between said open and closed positions comprising a reversible electric drive motor rigid with said vehicle and having a rotatable drive shaft; a motion transmitting member; means including a flexible rotatable component operatively connected between said drive shaft and said motion transmitting member for converting rotational movement of said shaft into axial movement of said member; a hollow rotatable motion transmitting member supported adjacent said rotatable component; means operatively connected between said axially moving motion transmitting member and said rotatable motion transmitting member for translating axial movement of said axially moving motion transmitting member into rotational movement of said rotatable member; and means connecting said rotatable motion transmitting member to one of said vent window pivot members.

7. The combination of claim 4, wherein said spiral slot extends from adjacent one end of said tubular member to adjacent the other end thereof and makes less than one turn around said member whereby said tubular member makes less than one rotation as said follower moves from one end of said slot to the other.

References Cited in the file of this patent

UNITED STATES PATENTS

| 2,398,231 | Kott | Apr. 9, 1946 |
| 2,883,183 | Finsterwalder et al. | Apr. 21, 1959 |
| 2,919,911 | Furtah | Jan. 5, 1960 |